(12) United States Patent
Gailloux et al.

(10) Patent No.: US 8,832,204 B1
(45) Date of Patent: Sep. 9, 2014

(54) TEXT MESSAGE SPAM SOLUTIONS

(75) Inventors: Michael A. Gailloux, Overland Park, KS (US); Kenneth W. Samson, Belton, MO (US)

(73) Assignee: Sprint Communication Company L.P., Overland Park, KS (US)

(*) Notice: Subject to any disclaimer, the term of this patent is extended or adjusted under 35 U.S.C. 154(b) by 404 days.

(21) Appl. No.: 12/566,383

(22) Filed: Sep. 24, 2009

(51) Int. Cl.
*G06F 15/16* (2006.01)
*H04W 4/12* (2009.01)
*H04W 4/24* (2009.01)
*H04L 12/58* (2006.01)

(52) U.S. Cl.
CPC . *H04W 4/12* (2013.01); *H04W 4/24* (2013.01); *H04L 12/585* (2013.01)
USPC .......................................... 709/206; 701/204

(58) Field of Classification Search
CPC ......... H04W 4/12; H04W 4/24; H04L 12/585
USPC ....................................................... 709/206
See application file for complete search history.

(56) References Cited

U.S. PATENT DOCUMENTS

| 6,167,435 | A | 12/2000 | Druckenmiller et al. |
| 6,701,160 | B1 | 3/2004 | Pinder et al. |
| 6,920,331 | B1 | 7/2005 | Sim et al. |
| 7,245,929 | B2 | 7/2007 | Henderson et al. |
| 7,650,140 | B2 | 1/2010 | Plumb et al. |
| 7,797,379 | B2 | 9/2010 | Hawkins |
| 7,966,027 | B1 | 6/2011 | Dudziak et al. |
| 8,064,893 | B1 | 11/2011 | Upadhyay et al. |
| 8,423,057 | B1 | 4/2013 | Upadhyay et al. |
| 2003/0083078 | A1 | 5/2003 | Allison et al. |
| 2004/0078274 | A1 | 4/2004 | Aarnio |
| 2004/0176072 | A1* | 9/2004 | Gellens ...................... 455/412.1 |
| 2004/0198454 | A1 | 10/2004 | Chavez et al. |
| 2005/0020289 | A1 | 1/2005 | Kim et al. |
| 2005/0147221 | A1 | 7/2005 | Aoki |
| 2006/0135168 | A1 | 6/2006 | Cai et al. |
| 2006/0135184 | A1 | 6/2006 | Schmidt et al. |
| 2006/0265423 | A1* | 11/2006 | Schinker ..................... 707/104.1 |
| 2007/0026879 | A1 | 2/2007 | Ala-Luukko |
| 2007/0106734 | A1* | 5/2007 | Mahajan et al. .............. 709/206 |

(Continued)

OTHER PUBLICATIONS

Upadhyay, Piyush, et al., Patent Application entitled, "Activating a Message Blocking Function From a Mobile Communication Device", filed Sep. 4, 2008, U.S. Appl. No. 12/204,028.

(Continued)

*Primary Examiner* — Tom Y Chang

(57) ABSTRACT

A system is provided for text message spam solutions. The system includes a server and a spam application. When executed by the server, the spam application receives a first text message from a handset, parses the first text message to identify a short code as an identifier of a communication device that originated the first text message, and adds the short code to a block list associated with the handset. The spam application also calculates a credit based on a history of text messages associated with the handset and the short code, and provides the credit to a service account associated with the handset. Additionally, the spam application determines whether a second text message is associated with the short code in the block list; and blocks the second text message if the second text message is associated with the short code in the block list.

19 Claims, 6 Drawing Sheets

(56) References Cited

U.S. PATENT DOCUMENTS

| | | | |
|---|---|---|---|
| 2007/0165821 A1* | 7/2007 | Altberg et al. | 379/210.02 |
| 2007/0238449 A1 | 10/2007 | Park et al. | |
| 2007/0254683 A1 | 11/2007 | Jie et al. | |
| 2008/0009299 A1 | 1/2008 | Ryu | |
| 2008/0196092 A1* | 8/2008 | Benschop et al. | 726/5 |
| 2008/0268883 A1 | 10/2008 | Shim | |
| 2009/0042539 A1* | 2/2009 | Jiang et al. | 455/408 |
| 2009/0150215 A1* | 6/2009 | Kalb et al. | 705/10 |
| 2009/0156166 A1 | 6/2009 | Van Der Weide | |
| 2010/0279650 A1* | 11/2010 | Asawa et al. | 455/406 |
| 2010/0317322 A1* | 12/2010 | Underwood et al. | 455/410 |
| 2012/0030293 A1* | 2/2012 | Bobotek | 709/206 |

OTHER PUBLICATIONS

Upadhyay, Piyush, et al., Patent Application entitled, "Preventing Spam Messages", filed Jan. 9, 2009, U.S. Appl. No. 12/351,460.

Office Action dated Mar. 21, 2011; U.S. Appl. No. 12/204,028, filed Sep. 4, 2008.

Final Office Action dated Sep. 29, 2011; U.S. Appl. No. 12/204,028, filed Sep. 4, 2008.

Advisory Action dated Dec. 13, 2011; U.S. Appl. No. 12/204,028, filed Sep. 4, 2008.

First Action Interview Pre-Interview Communication dated Jul. 25, 2011, U.S. Appl. No. 12/351,460, filed Jan. 9, 2009.

Notice of Allowance dated Sep. 16, 2011, U.S. Appl. No. 12/351,460, filed Jan. 9, 2009.

Notice of Allowance dated Dec. 12, 2012, U.S. Appl. No. 12/204,028, filed Sep. 4, 2008.

\* cited by examiner

TEXT MESSAGE SPAM SOLUTIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A handset may be a mobile phone, a telephone, a wireless communication device, a pager, a personal digital assistant, a portable computer, a tablet computer, a laptop computer, a digital camera, a digital music player, a digital calculator, an electronic key fob for keyless entry, a media player, or an inventory control device. A handset user may use a handset to both send email and text messages and to receive email and text messages, which may include the receipt of spam.

Spam is the abuse of electronic messaging systems, including most broadcast mediums and digital delivery systems, by sending unsolicited bulk messages indiscriminately. While the most widely recognized form of spam is e-mail spam, the term is applied to similar abuses in other media, such as instant messaging spam and mobile phone messaging spam. Spamming remains economically viable because advertisers have few operating costs beyond the management of their distribution lists, and it is difficult to hold senders accountable for their mass messages. Because the barrier to entry is so low, spammers are numerous and the volume of unsolicited messages has become very high. The costs, such as lost productivity and fraud, are borne by the public and by communication service providers, which have been forced to add extra capacity to cope with the deluge. Spamming is widely reviled, and has been the subject of legislation in many jurisdictions.

SUMMARY OF THE INVENTION

In some embodiments, a system is provided for text message spam solutions. The system includes a server and a spam application. When executed by the server, the spam application receives a first text message from a handset, parses the first text message to identify a short code as an identifier of a communication device that originated the first text message, and adds the short code to a block list associated with the handset. The spam application also calculates a credit based on a history of text messages associated with the handset and the short code, and provides the credit to a service account associated with the handset. Additionally, the spam application blocks a second text message if the second text message is associated with the short code in the block list.

In some embodiments, a computer implemented method is provided for text message spam solutions. A first text message is received from a handset. The first text message is parsed to identify a short code as an identifier of a communication device that originated the first text message. The short code is added to a block list associated with the handset. A credit is calculated based on a history of text messages associated with the handset and the short code. The credit is provided to a service account associated with the handset. A second text message is blocked if the second text message is associated with the short code in the block list.

In some embodiments, a computer implemented method is provided for text message spam solutions. A first text message and a keyword are received from a handset. The first text message is parsed to identify a short code as an identifier of a communication device that originated the first text message. A determination is made whether the keyword is associated with a block request. The short code is added to a block list associated with the handset if the keyword is associated with the block request. A credit is calculated based on a history of text messages associated with the handset and the short code in response to adding the short code to a block list associated with the handset. The credit is provided to a service account associated with the handset. A second text message is blocked if the second text message is associated with the short code in the block list.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
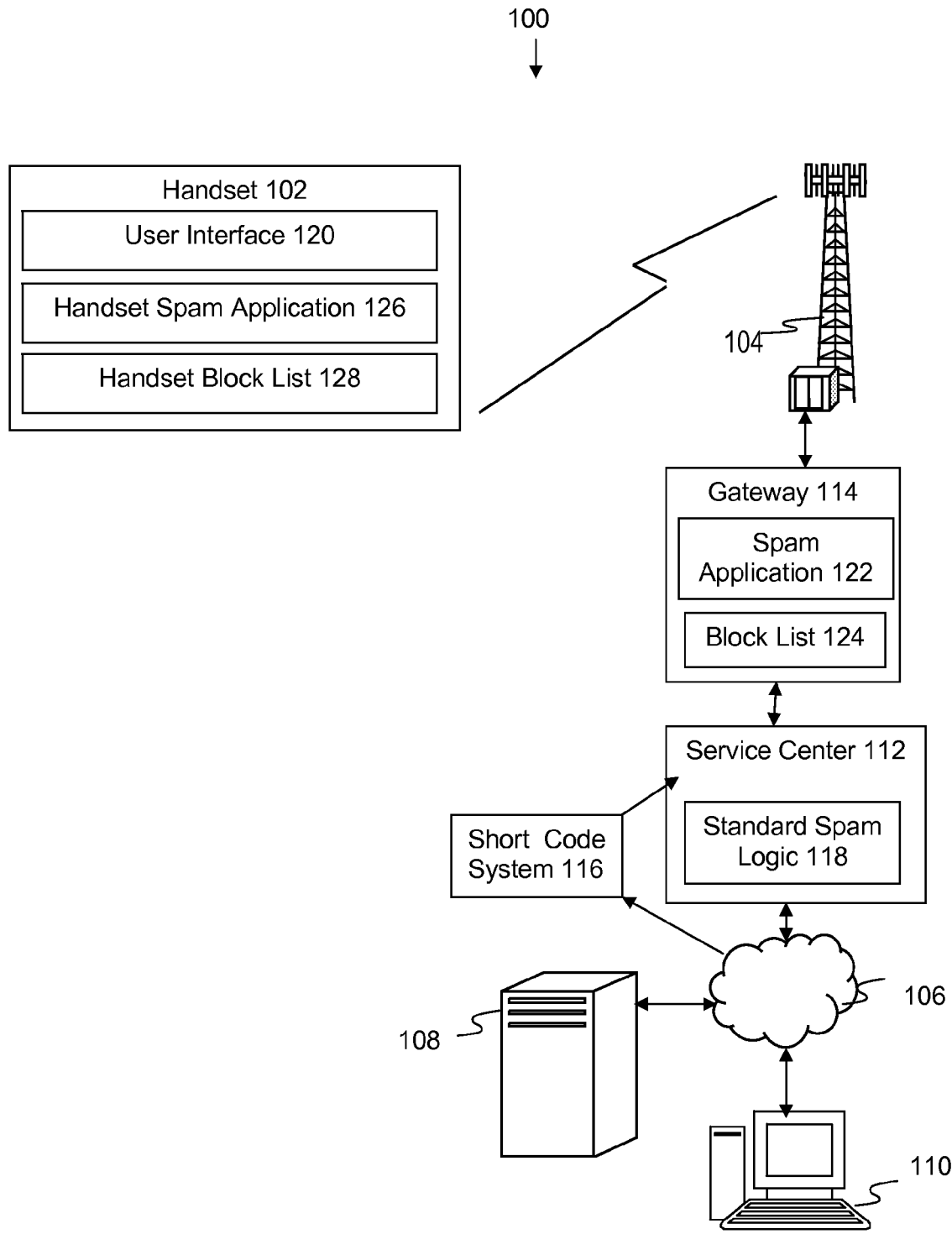
FIG. 1 is a block diagram of a system for text message spam solutions according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Communication service providers add standard spam logic to network components to block the delivery of text message spam that originates from internet protocol addresses, email addresses, and full telephone numbers. The standard spam logic is generic, such that it blocks the same identified spam for each communication service provider, and updates as new originators of spam are identified. Communication service providers may not be able to determine whether a handset user considers an incoming text message to be spam because a handset user may passively receive requested weather service alert text messages without replying to such text messages, which makes identification of spam based on lack of replies difficult. Even if an incoming text message does not fit the typical definition of spam, a handset user may consider the incoming text message as spam because of the lack of a convenient means for blocking receipt of the text message from the text message originator, which is a problem associated with originators of typical text message spam.

Furthermore, communication service providers face challenges when attempting to block delivery of text message spam sent from short codes. A short code is a special telephone number that is significantly shorter than a full telephone number and may be unique to an individual communication service provider's network. Short codes may be used as both the destination for a text message and as an originator of a text message. Communication service providers may have business agreements to convey text messages sent from short codes to a third party that routes the text messages from short codes in a region, such as from short codes in North America. When a communication service provider subsequently receives these text messages routed from the third party, these messages enter the communication service provider's network elements through a different port than the standard port where other text messages enter. The standard spam logic is designed to block messages that enter the standard port, but the standard spam logic is not designed to block messages that enter the port where the messages from short codes enter. Therefore, handsets may receive text message spam that originates from short codes, which may result in annoying the handset users who receive the text message spam. Furthermore, receipt of the text message spam may frustrate the handset users who have service plans that require payments based on receipt of each text message because these users' service accounts are charged for receiving unsolicited and unwanted text message spam.

Embodiments of the present disclosure provide systems and methods for text message spam solutions. If a handset user identifies a text message received from a short code as spam, the handset user forwards the text message to a spam application. The spam application parses the text message to identify the short code of the communication device that originated the text message, and adds the short code to a block list for the handset. The handset block list differs from the standard spam logic because the handset block list is personalized for each individual handset based on the text message spam specifically identified by the handset user. The spam application calculates a credit based on a history of text messages received by the handset from the short code to determine how much the handset's service account may have been charged for receipt of text message spam from the identified short code. The spam application provides the credit to the handset's service account to grant a refund for charges incurred for the text message spam received by the handset from the short code. If a subsequent text message is received from the short code that is added to the personalized block list, the spam application blocks the subsequent text message.

A handset user is spared the annoyance of receiving text message spam from the short codes identified by the handset user as originators of text message spam. Additionally, a handset user who has a service account that requires payments based on receipt of each text message may experience increased customer satisfaction when charges for identified text message spam are refunded to the handset service account.

FIG. 1 is a block diagram of a system 100 for text messages for services according to an embodiment of the present disclosure. The system 100 includes a handset 102, a base transceiver station (BTS) 104, a network 106, a server center 108, and a communication device 110. The handset 102, which may be a handset that uses a prepaid or a postpaid billing plan, communicates with the base transceiver station 104, which is coupled to the network 106. The network 106 may enable the handset 102 to access information on various servers, such as the server 108, and to communicate with communication devices, such as the communication device 110.

Communication between the handset 102 and the base transceiver station 104 may be via an integrated digital enhanced network (IDEN) communication technology, a code division multiple access (CDMA) technology, a global system for mobile communication (GSM) technology, a universal mobile telecommunications system (UMTS) technology, a long-term evolution (LTE) technology, a worldwide interoperability for microwave access (WiMAX) technology, or another air interface protocol technology.

The system 100 also includes a service center 112, a gateway 114, and a short code system 116. The service center 112 is a network component, such as a communication server that functions as a short message service center, which receives messages, such as short message service (SMS) messages, from an originator and forwards the messages to the recipient when the recipient is available. SMS is typically a transport architecture for sending text messages, such as messages of 160 characters or less. Although the SMS telecommunication protocol is discussed in the pending disclosure, it is only one example of a suitable message system within a network environment and other examples would suggest themselves to those of skill in the art. Neither should the pending disclosure be interpreted as having any dependency or requirement relating to any one or combination of particular telecommunication protocols described herein. In some embodiments, the service center 112 stores the messages until the recipient is available. The service center 112 applies a standard spam logic 118 to messages received from the network 106 that are intended for the handset 102. The standard spam logic 118 is designed to be applied universally in multiple types of networks 106 and to be updated periodically as new types and sources of spam are identified, similar to the universal spam logic that is commercially available for use on personal computers.

The gateway 114 provides a boundary between radio communication functions embodied in one or more radio systems for the access-facing portion of the system 100 and the standard internet protocol (IP) communication functions, including mobile IP, embodied in the public network-facing portion of the system, such as the network 106. The gateway 114 may be a push proxy gateway, a packet data serving node or home agent, an autonomous system number gateway, a server general packet radio service support node, a gateway general packet radio service support node, or other type of gateway, which may be implemented by a communication server.

The short code system 116 may be a network component managed by a third party that routes all short code text messages for a region, such as for North America. The short code system 116 provides text messages that originate from short codes to the service center 112 via a different port than the port used by the service center 112 to receive all other text messages.

The handset 102 includes a user interface 120, which presents content to the user of the handset 102. The system 100 also includes a spam application 122 and a block list 124.

Although FIG. 1 depicts the spam application 122 and the block list 124 on the gateway 114, which may be implemented by a communication server, all or part of the spam application 122 and the block list 124 may each be located on other communication servers in the system 100, which may not be depicted in FIG. 1. In some embodiments of the present disclosure, the handset 120 also includes a handset spam application 126 and a handset block list 128. FIG. 1 depicts the network components 102-128 for the purpose of an example, as the system 100 may include any number and type of the network components 102-128. Some details and/or components of the system 100 are not shown or described so as to not obscure embodiments of the pending disclosure.

The handset 102 may receive a text message that originates from a short code. The text message may be provided to multiple users that subscribe to a service provided by the communication device 110, such as text message alerts for stock prices, news updates, sports scores, etc. The handset user may immediately identify the text message as spam based on the content of the text message. Alternatively, the handset user may request more information about the text message to determine whether or not to respond to the text message as spam. The spam application 122 receives a request from the handset 102 to identify the short code and/or the communication device 110, parses the text message to identify the short code and/or the communication device 110, and provides the identification to the handset 102 for displaying the identification of the short code and/or the communication device 110. For example, the spam application 122 parses the text message to identify the short code 99999 as the originator of the message, and references a database of short codes to determine that the short code 99999 is associated with a weather service provider. The unsolicited text message received from the short code 99999 may provide a weather service subscribed to by the previous user of the mobile directory number for the handset 102 before the handset user began using the mobile directory number. A mobile directory number may also be referred to as the number or phone number for the handset 102.

If the handset user decides that the text message weather service is worth any service account charges that the handset user will incur for receiving such text messages in the future, the handset user may decide to take no action that identifies the text message as spam. However, if the handset user decides not to receive such text messages in the future or to not pay for receipt of such text messages in the future, the handset user uses the handset 102 to forward the text message to the spam application 122. Forwarding the text message to the spam application 122 may be accomplished via selection of a soft button provided by the handset spam application 126 or via typical text message forwarding that is available on handsets 102 to a full telephone number or a short code associated with the spam application 122.

The handset user may add a keyword in the heading or the text of the text message when forwarding the text message to the spam application 122. The keyword may be associated with a block request, an unblock request, a request to view the block list, or other similar requests. For example, the handset user may add the keyword "spam" or "block" when forwarding the text message to the spam application 122.

The spam application 122 receives the text message from the handset 102 if the user identifies the text message as spam and forwards the text message. The spam application 122 may parse the text message for an added keyword to determine how to process the text message. If the spam application 122 determines that the keyword is associated with a block request, the spam application 122 may continue parsing the text message to determine a short code to add to the block list 124. The spam application 122 parses the text message to identify the short code of the communication device 110 that originated the text message. For example, the spam application 122 identifies the short code 99999 as the originator of the weather alert text message.

The spam application 122 may add the short code to the block list 124 for the handset 102. For example, the spam application adds the short code 99999 to the block list 124 for the handset 102. The block list 124 differs from the standard spam logic 118 because the block list 124 is personalized for each individual handset 102 based on the text message spam specifically identified by the handset user. The block list 124 may be associated with multiple handsets 102. For example, if 90% of the handsets 102 served by a communication service provider individually identify text messages from the short code 66666 as spam, the spam application 122 may add the short code 66666 to a standard block list for each of the handsets 102 served by the communication service provider.

The spam application 122 calculates a credit based on a history of text messages received by the handset 102 from the short code to determine how much the handset's service account may have been charged for receipt of text message spam from the identified short code. The history of text messages associated with the handset 102 may be associated with a current billing cycle and/or a previous billing cycle. For example, the spam application 122 may determine that the handset 102 received text messages from the short code 99999 on three occasions during the current billing cycle and on two occasions during the previous billing cycle, and that the service account associated with the handset 102 has been charged $5 for these five text messages.

The spam application 122 may provide the credit to the handset's service account to provide a refund for charges incurred for the text message spam received by the handset 102 from the short code. The service account may be associated with a prepaid billing plan and/or a postpaid billing plan. For example, the spam application 122 adds a refund of $5 to a monthly bill for the handset 102, and the handset user may see the $5 refund upon receipt of the monthly bill or upon request for information associated with the handset user's monthly bill. In another example, the spam application 122 may add $5 to the prepaid account balance associated with the handset 102, such that the handset user may determine that $5 more is available for subsequent communications than the last time the handset user checked the prepaid account balance.

The spam application 122 may associate the short code in the block list 124 with a second short code that is associated with the communication device 110. For example, the spam application 122 may parse a text message to identify the short code 99999, reference a short code database to determine that the short code 99999 is associated with the weather service provider, and reference the short code database to determine that the weather service provider is also associated with the short code 88888. In this situation, the spam application 122 may add the short code 88888 to the block list 124 because the handset user has indicated that text messages from the weather service provider are considered spam.

If a subsequent text message is received from the short code that is added to the personalized block list 124, the spam application 122 blocks the subsequent text message. The subsequent text message may also be provided to multiple users that subscribe to a service provided by the communication device 110. For example, the spam application 122 blocks the subsequent message from the short code 88888 from being delivered to the handset 102, and the communication service provider does not charge the handset user's service account for the subsequent text message. The subsequent text message may be associated with the second short code. For example, the subsequent text message may originate from the short code 88888, and the spam application 122 may block the subsequent text message from delivery to the handset 102 because the spam application 122 associated the short code 88888 with the same communication device 110 that the handset user identified as an originator of spam via the short code 99999.

The spam application 122 may provide the subsequent text message to be displayed on the handset 102 in response to a determination that the subsequent text message is not associated with the short code in the block list 124. For example, the spam application 122 provides a text message from the short code 22222, sent by a friend of the handset user, to the handset 102.

The spam application 122 may determine whether the keyword is associated with an unblock request. For example, a few days after identifying the weather service text message as spam, the handset user decides that receiving such a text message would be worthwhile, references the text message application on the handset 102, and forwards the text messages previously identified as spam with the keyword "unblock." The spam application 122 receives the forwarded text message, parses the text message to identify the keyword "unblock" and the short code 99999, and removes the short code 99999 from the block list 124 associated with the handset 102.

However, the spam application 122 also may calculate a charge based on the history of text messages associated with the handset 102 and the short code and add the charge to the service account associated with the handset 102. The spam application 122 may reverse credits provided for text messages previously identified as spam messages. Otherwise, a handset user with limited funds may enjoy the benefits of receiving specific text messages from short codes for a month, request and receive a block on these text messages and a full refund at the end of the month, and then have the text messages unblocked at the beginning of the next month, such that the handset user receives the specific text messages each month without paying for their receipt. The spam application 122 may verify that the history of text messages associated with the handset 102 and the short code includes a credit calculated based on the history of text messages associated with the handset 102 and the short code. For example, the spam application 122 adds charges back to the handset user's service account only for the text messages from the short code for which the spam application 122 provided a credit.

The spam application 122 may determine whether the keyword is associated with a view block list request. For example, the handset user may add the word "view" to any text message forwarded to the spam application 122. The spam application 122 may receive the text message, parse the text message to identify the keyword "view," and provide the block list 124 associated with the handset 102 to be displayed on the handset 102. In another example, rather than communicating externally to view the block list 124, the handset spam application 126 may retrieve the handset block list 128 from the handset 102. The handset spam application 126 may have previously parsed each text message forwarded to the spam application 122 to identify block requests and the short codes requested to be blocked, and previously stored the short codes to be blocked in the handset block list 128. Retrieving the handset block list 128 from the handset 102 may be quicker for the handset user to view and less expensive for the communication service provider to provide.

The spam application 122 may receive an unblock request associated with a short code in the block list 124 and/or the handset block list 128, and remove the short code from the block list 124 and/or the handset block list 128 associated with the handset 102. For example, if the handset user views the block list 124 and decides to receive the weather alert text messages from the short code 99999, the handset user may forward the text message previously received from the short code 99999 with the keyword "unblock" to the spam application 122. Alternatively, the handset spam application 126 may provide a soft button associated with the short code 99999 to the handset user while the handset user is viewing the handset block list 128, such that selection of the soft button sends an unblock request to the spam application 122. The handset spam application 126 may update the handset block list 128 based on any unblock requests sent to the spam application 122.

A handset user is spared the annoyance of receiving text message spam from the short codes identified by the handset user as originators of text message spam. Additionally, if the handset user has a service account that requires payments based on receipt of each text message, the handset user may experience increased customer satisfaction when charges for identified text message spam are refunded to their service accounts. Instead of a communication service provider incurring significant expenses operating and staffing a customer service center that receives requests for blocks of text message spam and/or requests for refunds for receipt of text message spam from frustrated customers, the pending disclosure provides text message solutions that may increase customer satisfaction and reduce expenses for the customer service provider.

Figure 2:
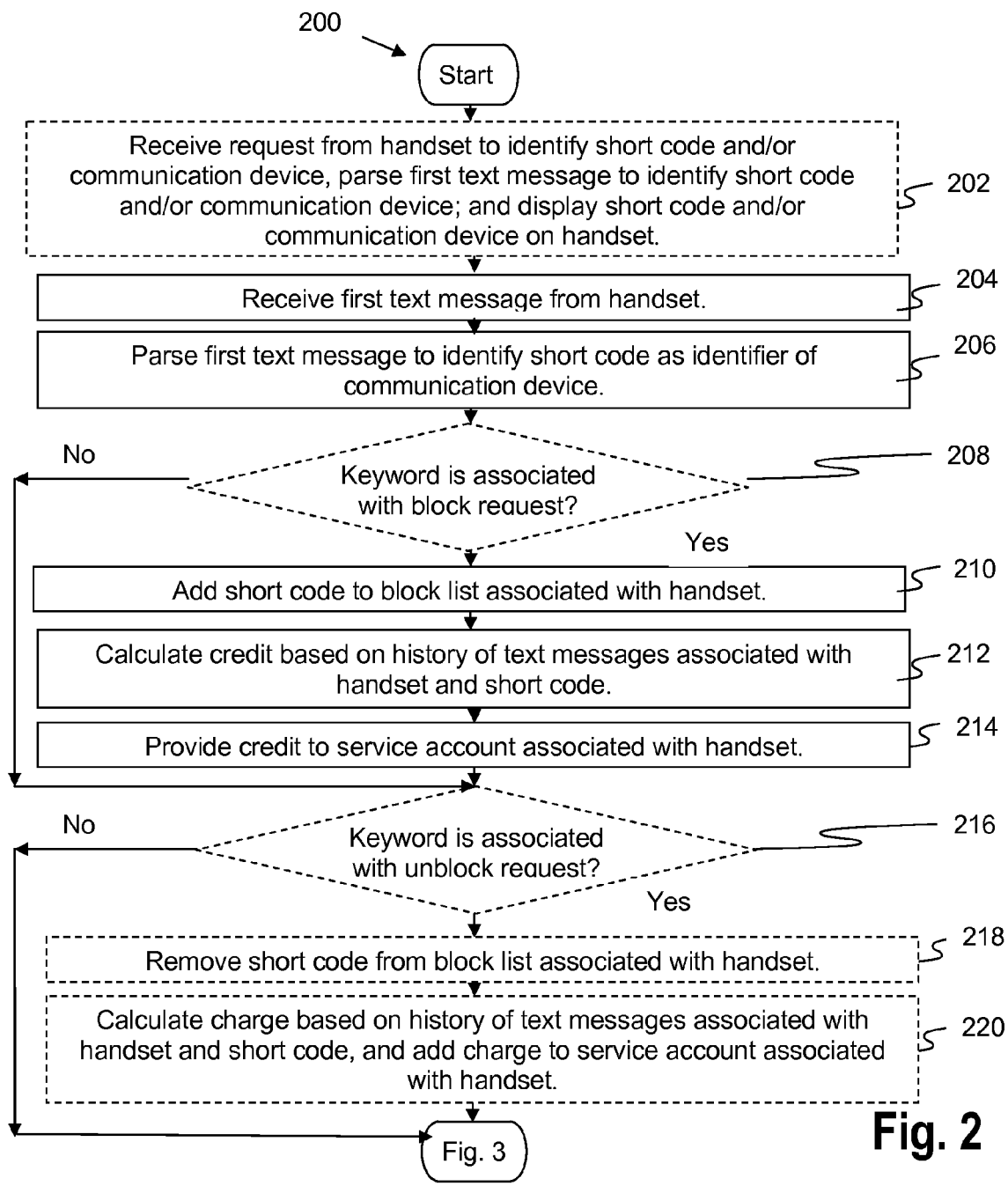
FIG. 2 is a flowchart of a method for text message spam solutions according to some embodiments of the present disclosure.

FIG. 2 is a flowchart of a method 200 for text message spam solutions according to some embodiments of the present disclosure. The system 100 can execute the method 200 to identify short codes that a handset user considers to have sent text message spam and provide refunds to the handset user for any charges for receiving the text message spam.

In box 202, a request is optionally received from a handset to identify a short code and/or a communication device, a first text message is optionally parsed to identify the short code and/or the communication device; and the identification of short code and/or the communication device is optionally displayed on the handset. For example, the spam application 122 displays the identification of the communication device 110 as the weather service provider on the handset 102.

In box 204, a first text message is received from a handset. For example, the spam application 122 receives a weather service alert text message from the handset 102.

In box 206, a first text message is parsed to identify a short code as an identifier of a communication device. For example, the spam application 122 parses the weather service alert text message to identify the short code 99999 as the identifier of the communication device 110. In another example, the handset spam application 126 parses the weather service alert text message to identify the short code 99999 as the identifier of the communication device 110.

In box 208, a determination is optionally made whether a keyword is associated with a block request. For example, the spam application 122 determines whether the keyword "spam" is associated with a block request. If the spam application 122 determines that the keyword is associated with a block request, the method 200 continues to box 210. If the spam application 122 determines that the keyword is not associated with a block request, the method 200 proceeds to box 216.

In box 210, a short code is added to a block list associated with a handset. For example, the spam application 122 adds the short code 99999 to the block list 124 associated with the handset 102. In another example, the handset spam application 126 adds the short code 99999 to the handset block list 128.

In box 212, a credit is calculated based on a history of text messages associated with a handset and a short code. For example, the spam application 122 calculates a credit of $5 based on a history of text messages associated with the handset 102 and short code 99999.

In box 214, a credit is provided to a service account associated with a handset. For example, the spam application 122 provides a credit of $5 to a service account associated with the handset 102.

In box 216, a determination is optionally made whether a keyword is associated with an unblock request. For example, the spam application 122 determines whether the keyword "unblock" is associated with an unblock request. In another example, the handset spam application 126 determines whether the keyword "unblock" is associated with an unblock request. If the spam application 122 determines that the keyword is associated with an unblock request, the method 200 continues to box 218. If the spam application 122 determines that the keyword is not associated with an unblock request, the method 200 continues to box 222 on FIG. 3.

In box 218, a short code is optionally removed from a block list associated with handset. For example, the spam application 122 removes the short code 99999 from the block list 124 associated with the handset 102. In another example, the handset spam application 126 removes the short code 99999 from the handset block list 128.

In box 220, a charge is optionally calculated based on a history of text messages associated with a handset and a short code, and the charge is optionally added to a service account associated with a handset. For example, the spam application 122 calculates a charge of $5 based on a history of text messages associated with the handset 102 and the short code 99999, and adds the charge of $5 to the service account associated with the handset 102.

Figure 3:
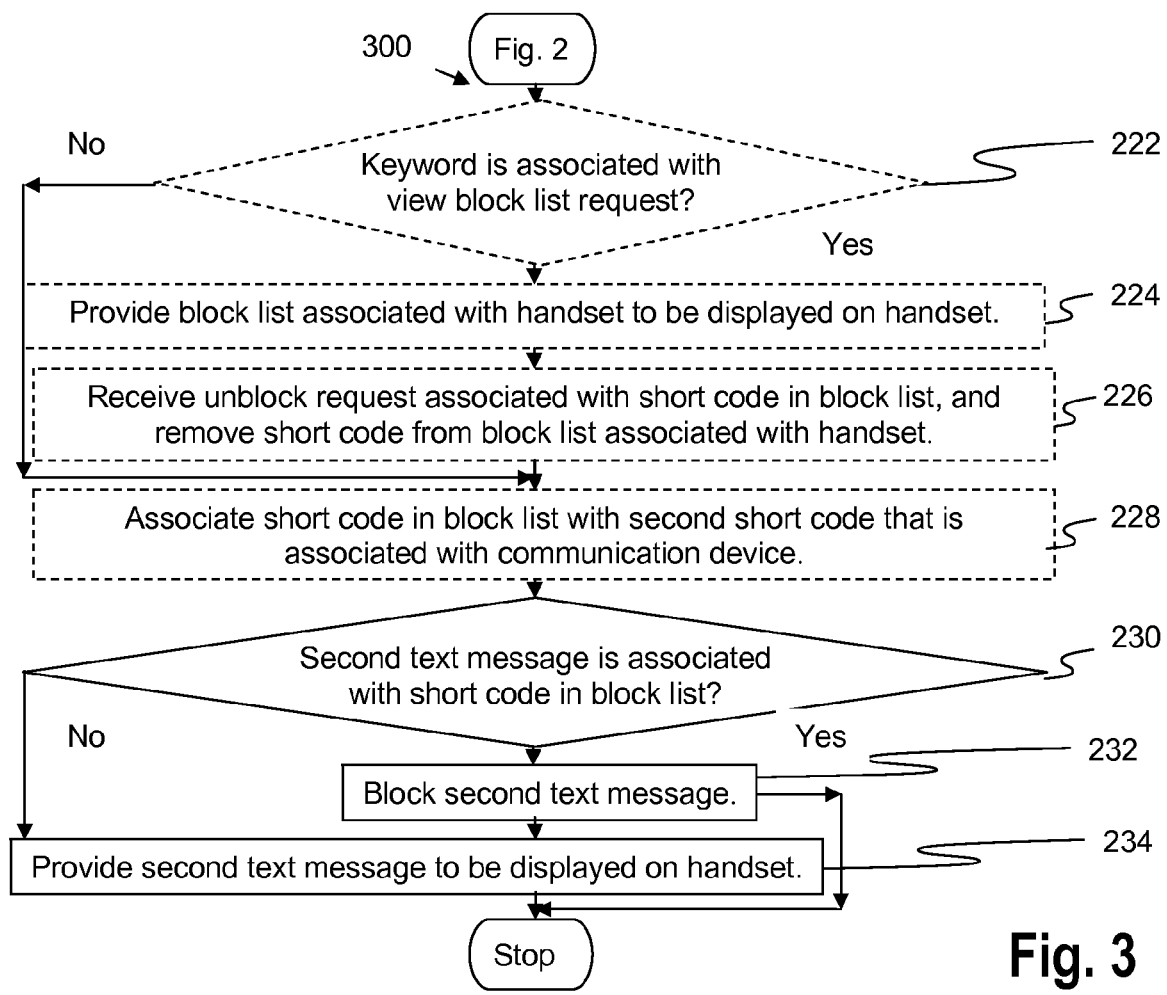
FIG. 3 is a flowchart of another method for text message spam solutions according to some embodiments of the present disclosure.

FIG. 3 is a flowchart of a method 300 for text message spam solutions according to some embodiments of the present disclosure. The system 100 can execute the method 300 to block text messages from short codes that are identified on the block list 124 for the handset 102.

In box 222, a determination is optionally made whether a keyword is associated with a view block list request. For example, the spam application 122 determines whether the keyword "view" is associated with a view block list request. In another example, the handset spam application 126 determines whether the keyword "view" is associated with a view block list request. If the spam application 122 determines that the keyword is associated with a view block list request, the method 300 continues to box 224. If the spam application 122 determines that the keyword is not associated with a view block list request, the method 300 proceeds to box 228.

In box 224, a block list associated with a handset is optionally provided to be displayed on the handset. For example, the spam application 122 provides the block list 124 associated with the handset 102 to be displayed on the handset 102. In another example, the handset spam application 126 provides the handset block list 128 to be displayed on the handset 102.

In box 226, an unblock request associated with short code in block list is optionally received, and a short code is optionally removed from the block list associated with a handset. For example, the spam application 122 receives an unblock request associated with the short code 99999 in the block list 124, and removes the short code 99999 from the block list 124 associated with the handset 102. In another example, the handset spam application 126 receives an unblock request associated with the short code 99999 in the handset block list 128, and removes the short code 99999 from the handset block list 128.

In box 228, a short code in a block list is optionally associated with a second short code that is associated with a communication device. For example, the spam application 122 associates the short code 99999 in the block list 124 with the short code 88888 that is associated with the communication device 110.

In box 230, a determination is made whether a second text message is associated with a short code in a block list. For example, the spam application 122 determines whether a subsequent text message is associated with the short code 99999 in the block list 124. If the spam application 122 determines that the second text message is associated with a short code in the block list 124, the method 300 continues to box 232. If the spam application 122 determines that the second text message is associated with a short code in the block list 124, the method 300 proceeds to box 234.

In box 232, a second text message is blocked. For example, the spam application 122 blocks the subsequent text message from the short code 99999, and the method 300 terminates.

In box 234, a second text message is provided to be displayed on a handset. For example, the spam application 122 provides the subsequent text message from the short code 22222 to be displayed on the handset 102.

Figure 4:
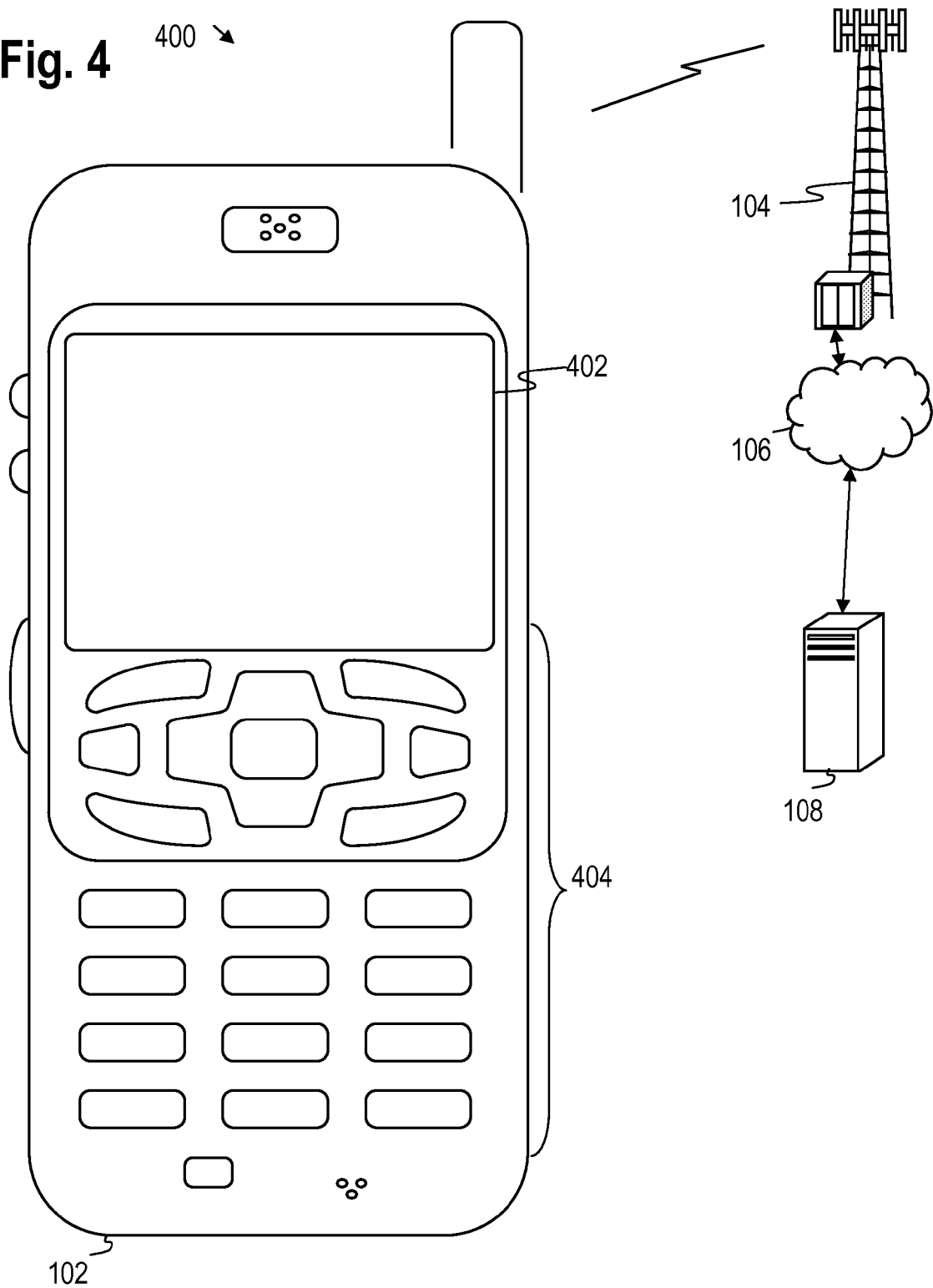
FIG. 4 shows an illustrative wireless communications system according to some embodiments of the present disclosure.

FIG. 4 shows a wireless communications system 400 including the handset 102. FIG. 4 depicts the handset 102, which may be referred to as handset 102, which is operable for implementing aspects of the present disclosure, but the present disclosure should not be limited to these implementations. Though illustrated as a mobile phone, the handset 102 may take various forms including a telephone, a wireless communication device, a pager, a personal digital assistant (PDA), a portable computer, a tablet computer, a laptop computer, a digital camera, a digital music player, a digital calculator, an electronic key fob for keyless entry, a media player, and an inventory control device. Many suitable handsets 102 combine some or all of these functions. In some embodiments of the present disclosure, the handset 102 is not a general purpose computing device, but rather is a special-purpose communications device such as a mobile phone, wireless mobile device, pager, or PDA. The handset 102 may support specialized activities such as gaming, inventory control, job control, and/or task management functions, and so on.

The handset 102 includes the display 402 and a touch-sensitive surface or keys 404 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset 102. The handset 102 may further execute one or more software or firmware applications in response to user commands. These applications may configure the handset 102 to perform various customized functions in response to user interaction. Additionally, the handset 102 may be programmed and/or configured over-the-air, for example from a wireless base station, a wireless access point, or a peer handset 102.

The handset 102 may execute a web browser application which enables the display 402 to show a web page. The web page may be obtained via wireless communications with the base transceiver station 104, a wireless network access node, a peer handset 102 or any other wireless communication network or system. While a single base transceiver station 104 is illustrated, it is understood that the wireless communication system may comprise additional base transceiver stations 104. In some instances, the handset 102 may be in communication with multiple base transceiver stations 104 at the same time. The base transceiver station 104 (or wireless network access node) is coupled to the network 106. Via the wireless link and the network 106, the handset 102 has access to information on various servers, such as the server 108. The server 108 may provide content that may be shown on the display 402. Alternately, the handset 102 may access the base transceiver station 104 through a peer handset 102 acting as an intermediary, in a relay type or hop type of connection.

Figure 5:
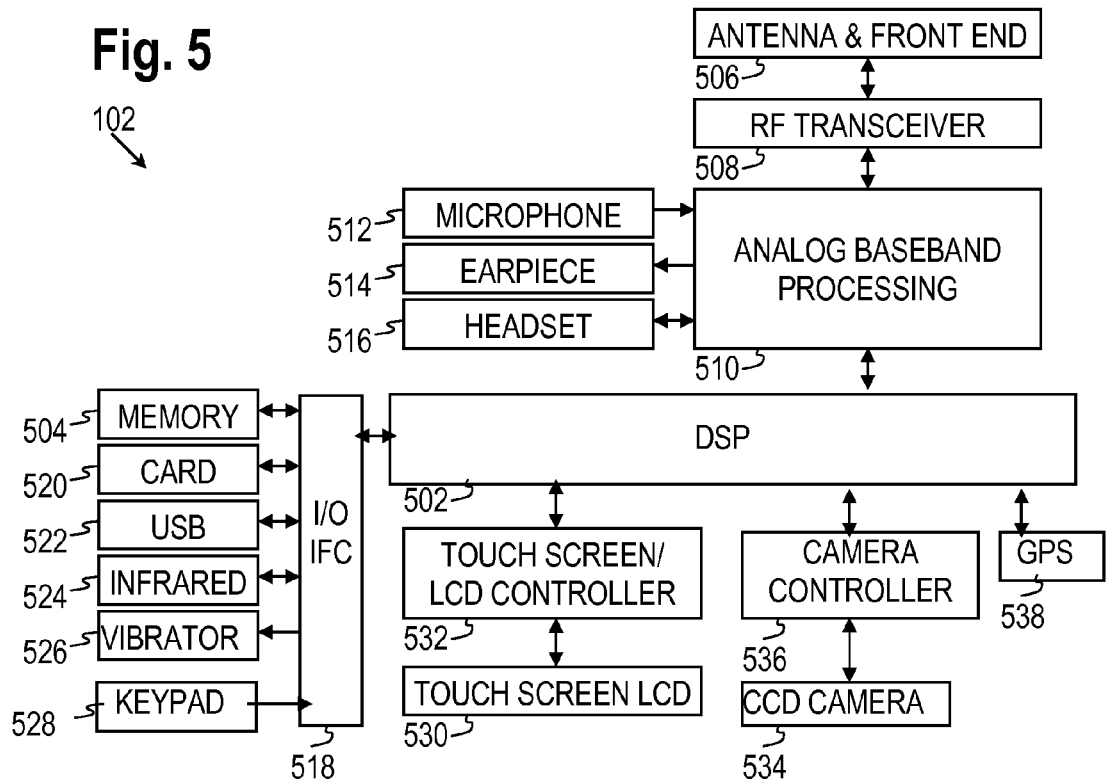
FIG. 5 is a block diagram of an illustrative handset according to some embodiments of the present disclosure.

FIG. 5 is a block diagram of the handset 102. While a variety of known components of the handset 102 are depicted, in an embodiment a subset of the listed components and/or additional components not listed may be included in the handset 102. The handset 102 includes a digital signal processor (DSP) 502 and a memory 504. As shown, the handset 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 102 to send and receive information from a radio access network (RAN) or some other available wireless communications network or from a peer handset 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the handset 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the handset 102 to function as a peripheral device to exchange information with a personal computer or other computer system. The infrared port 524 and other optional ports such as a Bluetooth interface or an IEEE 802.11 compliant wireless interface may enable the handset 102 to communicate wirelessly with other nearby handsets 102 and/or wireless base stations.

The input/output interface 518 may further connect the DSP 502 to the vibrator 526 that, when triggered, causes the handset 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 102. Another input mechanism may be the touch screen LCD 530, which also may display text and/or graphics to the user. The touch screen LCD controller 532 couples the DSP 502 to the touch screen LCD 530.

The CCD camera 534 enables the handset 102 to take digital pictures. The DSP 502 communicates with the CCD camera 534 via the camera controller 536. The GPS sensor 538 is coupled to the DSP 502 to decode global positioning system signals, thereby enabling the handset 102 to determine its position. In another embodiment, a camera operating according to a technology other than charge coupled device cameras may be employed. Various other peripherals also may be included to provide additional functions, e.g., radio and television reception.

Figure 6:
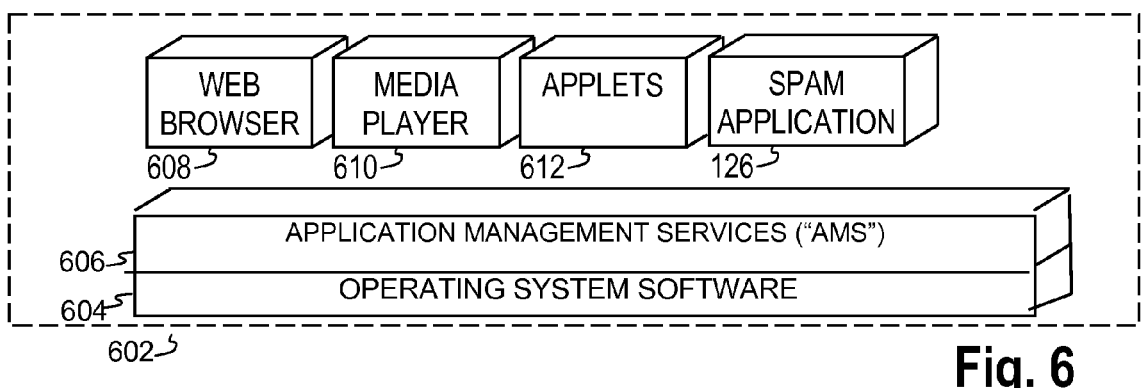
FIG. 6 is a block diagram of an illustrative software configuration for a handset according to some embodiments of the present disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 102. Also shown in FIG. 6 are a web browser application 608, a media player application 610, JAVA applets 612, and the handset spam application 126. The web browser application 608 configures the handset 102 to operate as a web browser, allowing a user to enter information into forms and select links to retrieve and view web pages. The media player application 610 configures the handset 102 to retrieve and play audio or audiovisual media. The JAVA applets 612 configure the handset 102 to provide games, utilities, and other functionality.

Figure 7:
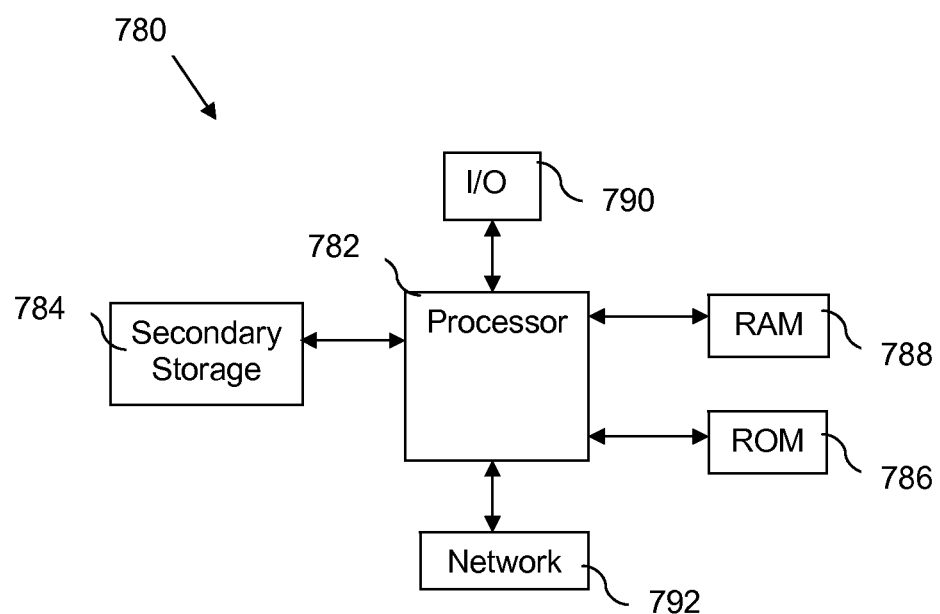
FIG. 7 shows an illustrative computer system suitable for implementing portions of the several embodiments of the present disclosure.

Some aspects of the system described above may be implemented on a computer with sufficient processing power, memory resources, and network throughput capability to handle the necessary workload placed upon it. FIG. 7 illustrates a typical computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for spam text message solutions, comprising:
a server; and
a spam application, when executed by the server, that
receives a first text message from a handset;
in response to receiving the first text message:
parses the first text message to identify a short code as an identifier of a provider that originated the first text message;
adds the short code to a block list associated with the handset;
determines the provider associated with the short code;
performs a database lookup using the provider associated with the short code as a lookup key to determine whether the provider is associated with a second short code different from the short code;
adds the second short code to the block list associated with the handset in response to a determination that the provider is associated with the second short code; and
creates an association in the block list between the second short code and the short code in response to adding the second short code to the block list;
calculates a credit charged for the first text message, wherein the credit is determined based on identifying the first text message within a history of text messages received by the handset using the short code;
provides the credit to a service account associated with the handset;
determines whether a second text message is associated with at least one of the short code and the second short code in the block list; and
blocks the second text message in response to a determination that the second text message is associated with at least one of the short code and the second short code in the block list.

2. The system of claim 1, wherein the handset is one of a mobile phone, a telephone, a wireless communication device, a pager, a personal digital assistant, a portable computer, a tablet computer, a laptop computer, a digital camera, a digital music player, a digital calculator, an electronic key fob for keyless entry, a media player, and an inventory control device.

3. The system of claim 1, wherein the block list is associated with a plurality of handsets.

4. The system of claim 1, wherein the history of text messages is associated with at least one of a current billing cycle and a previous billing cycle.

5. The system of claim 1, wherein the service account is associated with one of a prepaid billing plan and a postpaid billing plan.

6. The system of claim 1, wherein at least one of the first text message and the second text message is a short message service (SMS) message.

7. The system of claim 1, wherein at least one of the first text message and the second text message is provided to a plurality of users that subscribe to a service provided by the provider.

8. A computer implemented method for text message spam solutions, comprising:
   receiving a first text message from a handset;
   in response to receiving the first text message:
   parsing the first text message to identify a short code as an identifier of a provider that originated the first text message;
   adding the short code to a block list associated with the handset;
   determining the provider associated with the short code;
   performing a database lookup using the provider associated with the short code as a lookup key to determine whether the provider is associated with a second short code different from the short code;
   adding the second short code to the block list associated with the handset in response to a determination that the provider is associated with the second short code; and
   creating an association in the block list between the second short code and the short code in response to adding the second short code to the block list;
   calculating a credit charged for the first text message, wherein the credit is determined based on identifying the first text message within a history of text messages received by the handset using the short code;
   providing the credit to a service account associated with the handset;
   determining whether a second text message is associated with at least one of the short code and the second short code in the block list; and
   blocking the second text message in response to a determination that the second text message is associated with at least one of the short code and the second short code in the block list.

9. The computer implemented method of claim 8, wherein the second text message is associated with the second short code.

10. The computer implemented method of claim 8, further comprising providing the second text message to be displayed on the handset in response to a determination that the second text message is not associated with at least one of the short code and the second short code in the block list.

11. The computer implemented method of claim 8, further comprising:
   receiving a request from the handset to identify at least one of the short code and the provider;
   parsing the first text message to identify at least one of the short code and the provider; and
   displaying an identification of at least one of the short code and the provider on the handset.

12. The computer implemented method of claim 8, wherein the block list is located on at least one of the handset and a communication server.

13. A computer implemented method for text message spam solutions, comprising:
   receiving a first text message and a keyword from a handset;
   in response to receiving the first text message and the keyword:
   parsing the first text message to identify a short code as an identifier of a provider that originated the first text message;
   determining whether the keyword is associated with a block request;
   adding the short code to a block list associated with the handset in response to a determination that the keyword is associated with the block request;
   determining the provider associated with the short code;
   performing a database lookup using the provider associated with the short code as a lookup key to determine whether the provider is associated with a second short code different from the short code;
   adding the second short code to the block list associated with the handset in response to a determination that the provider is associated with the second short code; and
   creating an association in the block list between the second short code and the short code in response to adding the second short code to the block list;
   calculating a credit charged for the first text message, wherein the credit is determined based on identifying the first text message within a history of text messages received by the handset using the short code;
   providing the credit to a service account associated with the handset;
   determining whether a second text message is associated with at least one of the short code or the second short code in the block list; and
   blocking the second text message in response to a determination that the second text message is associated with at least one of the short code and the second short code in the block list.

14. The computer implemented method of claim 13, further comprising:
   determining whether the keyword is associated with an unblock request; and
   removing the short code from the block list associated with the handset in response to a determination that the keyword is associated with the unblock request.

15. The computer implemented method of claim 14, further comprising:
   calculating a charge based on the history of text messages associated with the handset and the short code; and
   adding the charge to the service account associated with the handset.

16. The computer implemented method of claim 15, wherein the history of text messages associated with the handset and the short code comprises the credit calculated based on the history of text messages associated with the handset and the short code.

17. The computer implemented method of claim 13, further comprising:
   determining whether the keyword is associated with a view block list request; and providing the block list associated with the handset to be displayed on the handset in response to a determination that the keyword is associated with the view block list request.

18. The computer implemented method of claim 17, wherein providing the block list associated with the handset comprises accessing the block list on the handset.

19. The computer implemented method of claim 17, further comprising:
   receiving an unblock request associated with the short code in the block list; and
   removing the short code from the block list associated with the handset.

* * * * *